June 9, 1936.     F. C. FRARY     2,043,743

ALUMINA PRODUCTION

Filed Sept. 8, 1934

```
┌─────────────────────────────────┐
│ ALUM DRIED AT TEMPERATURE       │
│ BELOW MELTING POINT UNTIL       │
│ IT WILL NO LONGER MELT          │
│ WHEN HEATED.                    │
└─────────────────────────────────┘
        │
   ┌─────────┐
   │ WATER   │
   │ VAPOR   │
   └─────────┘
        │
┌──────────────────────────────────────────┐
│ DRIED ALUM HEATED TO TEMPERATURE         │
│ ABOVE DECOMPOSITION POINT OF $K_2S_2O_7$ │
│ BUT BELOW DECOMPOSITION POINT            │
│ OF $Al_2(SO_4)_3$.                       │
└──────────────────────────────────────────┘
        │
   ┌─────────┐
   │ WATER   │
   │ VAPOR   │
   └─────────┘
        │
┌────────────────────────────────────────────┐
│ MIXTURE OF $K_2SO_4$ AND $Al_2(SO_4)_3$    │
│ HEATED TO DECOMPOSE $Al_2(SO_4)_3$.        │
└────────────────────────────────────────────┘
        │                          │
┌──────────────────┐      ┌──────────────────┐
│ $SO_2$, $SO_3$ AND $O_2$ │ $K_2SO_4 + Al_2O_3$ │
│ EVOLVED, SENT TO │      │ SENT TO LEACHING │
│ $H_2SO_4$ PLANT. │      │ PLANT.           │
└──────────────────┘      └──────────────────┘
```

INVENTOR.

FRANCIS C. FRARY.

BY George L Wallace

ATTORNEY.

Patented June 9, 1936

2,043,743

UNITED STATES PATENT OFFICE 2,043,743

ALUMINA PRODUCTION

Francis C. Frary, Oakmont, Pa., assignor to Aluminum Company of America, Pittsburgh, Pa., a corporation of Pennsylvania Application September 8, 1934, Serial No. 743,307

6 Claims. (Cl. 23—142)

This invention relates to the manufacture of alumina. It relates especially to the calcination of alum as a step in the recovery of alumina therefrom in substantially pure form.

In the past it has frequently been proposed to obtain alumina from various ores or aluminous raw materials by processes involving treatment of the raw material with sulfuric acid and obtaining potash alum or other alkali metal alum as an intermediate product. To obtain substantially all of the alumina dissolved by the sulfuric acid in the form of normal alum, it has usually been necessary to add potassium sulfate or some other salt of an alum-forming metal, or of ammonia, to the ore or to the aqueous extract from the sulfatized ore, as is well known. The solution of sulfates thus produced is separated from the insoluble residues by filtration or otherwise, and alum is crystallized from the solution. The mother liquor from the alum crystallization may be returned to the sulfating stage for the subsequent recovery of values remaining therein, and the alum may be recrystallized one or more times, or otherwise treated if desired, to substantially eliminate iron or other impurities.

It is also known that the alum, such as potash alum, obtained as described in the preceding paragraph, or in any other manner, may be calcined to first drive off water and then to drive off $SO_3$ contained in the aluminum sulfate constituent of the alum. An anhydrous mixture of potassium sulfate and alumina is obtained at suitable temperatures, and it is the usual practice to stop the calcination at this point and to separate the constituents of the calcined residue by dissolving out the potassium sulfate from the water-insoluble alumina. If desired, however, the calcination may be continued to higher temperatures, at which the potassium sulfate also decomposes, giving off more $SO_3$ and forming potassium aluminate.

Processes of this nature have been applied to compounds related to alum, such as alunite and other natural ores containing aluminum and potassium, with some success, but in the calcination of normal potash alum, $K_2SO_4.Al_2(SO_4)_3.24H_2O$, serious difficulties have been encountered. The most troublesome of these difficulties are that (1) the crystals melt in their 24 molecules of water of crystallization at temperatures of about 90° C., then swell and become light and porous and difficult to handle or calcine; and (2) as the calcination proceeds in a kiln or multiple hearth furnace, for example, the $SO_3$ liberated by the decomposition of aluminum sulfate at higher temperatures combines with some of the potassium sulfate in the incoming charge, forming potassium pyrosulfate, $K_2S_2O_7$. The pyrosulfate melts at a temperature of about 414° C. and attacks the furnace lining vigorously. Then at higher temperatures, up to about 600° C., it gives up its excess $SO_3$ again, leaving potassium sulfate at a temperature well below its melting point. This reformed $K_2SO_4$ freezes into a solid ring or cake and seriously interferes with the operation.

The principal object of my present invention is to provide a method of calcining alum in which the difficulties previously encountered are obviated. Another object is to provide an improved process of manufacturing alumina in which alum is an intermediate product.

The drawing diagrammatically illustrates the process in flow-sheet form.

My invention contemplates avoiding the difficulties previously encountered by conducting the calcination of the alum in three stages. In the first stage the alum is heated at temperatures below its melting point until the water is removed to such an extent that the material no longer melts in its water of crystallization. In the second stage it is heated further to a temperature above the decomposition point of $K_2S_2O_7$, but below the decomposition point of $Al_2(SO_4)_3$, which substantially completes the elimination of water. In the third stage the substantially anhydrous material is heated further to the desired decomposition temperature and the sulfurous gases evolved are withdrawn without contacting the material in the preceding stages, and recovered or utilized as may be desired.

The first stage of the calcination may be conducted in a rotary kiln or multiple hearth furnace, or other suitable apparatus in which the alum crystals are heated at controlled temperatures, preferably in a current of air, products of combustion, or other unreactive gases. While the temperature of the alum should not be allowed to exceed about 80° to 90° C. initially, heating may be accomplished by a stream of flue gases or the like at somewhat higher temperatures, such as about 150° C., for example. The temperature may be maintained substantially constant throughout this first stage of the calcination, or it may be gradually increased as the water is removed. When about half of the approximately 45 per cent water content initially present in the alum crystals has been removed, the first stage may be considered completed.

The alum dehydrated to about 20 to 23 per cent water or less in the first stage is then heated further to about 600 to 650° C. without melting or decomposition. This second stage of the calcination may be conducted in the same kiln or furnace as the first stage, but in a different portion of it if a continuous process is employed, or it may take place in a separate chamber or furnace of any suitable type. The material discharged from the second stage is substantially anhydrous alum at a temperature above the decomposition point of $K_2S_2O_7$ but below the temperature at which aluminum sulfate decomposes.

This material is charged into another retort or furnace, or a muffled hearth of a multiple hearth furnace, which is maintained at a temperature above about 600° C. and preferably between about 700° and 1000° C. At this temperature the aluminum sulfate constituent of the alum decomposes, giving off $SO_3$ and leaving a mixture of $Al_2O_3$ and $K_2SO_4$. The mixture can be separated by leaching with water to dissolve the $K_2SO_4$. This can be crystallized and recovered, or returned in the form of solution or crystals to the initial sulfate-extraction stage where it combines with aluminum sulfate to form more alum. The remaining alumina is of high purity and suitable for reduction to metallic aluminum. The gases given off in the third stage, consisting of $SO_3$ and its decomposition products, $SO_2$ and oxygen, are withdrawn without contacting the partially calcined material in the preceding stages and may be absorbed in sulfuric acid or passed through a convertor to form $H_2SO_4$. In either case the acid may be utilized in extracting further quantities of aluminous raw material to form aluminum sulfate. Alternatively, the $SO_3$ or mixture of $SO_3$ with $SO_2$ and $O_2$ may be returned directly to the extracting stage, with or without passing a catalyst and usually with the addition of some water, to form a further quantity of aluminum sulfate or alum.

Since the alum is never heated above its melting point in the practice of the calcination in accordance with my invention, one of the chief difficulties of previous processes is avoided. Also, since the alum is maintained at a temperature above the decomposition point of $K_2S_2O_7$ whenever it comes in contact with free $SO_3$, the other principal difficulty is avoided. Furthermore, since the process may be readily operated in a cyclic manner with return of potassium salts and sulfuric acid to the system as described, an economical process of alumina recovery is made practically available by my invention.

While I have described my invention with reference to certain operating conditions which are now considered preferable, it is to be understood that the process can be variously modified or practiced within the scope of the appended claims without departing from the spirit of the invention.

I claim:

1. The process of calcining alum, which comprises heating the alum at a temperature below its melting point to drive off water, then further heating to a temperature above the temperature at which potassium pyrosulfate is decomposed but below the temperature at which aluminum sulfate decomposes, then still further raising the temperature to decompose the aluminum sulfate constituent of the alum and to drive off gases containing sulfur trioxide, and withdrawing the gases containing sulfur trioxide without contacting them with that portion of the alum which is at temperatures substantially below the temperature at which potassium pyrosulfate decomposes.

2. The process of calcining potash alum, which comprises heating the alum at a temperature below its melting point to drive off a substantial portion of its water of crystallization, then heating further to a temperature of about 600° C. without decomposing or melting the alum while keeping the alum out of contact with uncombined sulfur trioxide, and then decomposing the aluminum sulfate constituent of the alum by heating to a temperature between about 700° and 1000° C. and withdrawing the gases evolved without permitting them to contact the alum at temperatures below about 600° C.

3. The process of calcining potash alum, which comprises heating alum at a temperature below its melting point in a current of gas to remove at least about half of its water of crystallization, heating further to a temperature of about 600° C. without decomposing or melting the alum, and heating in a third stage to a temperature of about 700° to 1000° C. while withdrawing the sulfur-bearing gases evolved, and keeping said gases out of contact with the alum in the preceding stages.

4. In a process of calcining potash alum, the combination of steps comprising supplying substantially anhydrous alum at a temperature of at least about 600° C., heating said alum to a temperature of about 700° C. to 1000° C. to decompose its aluminum sulfate content into alumina and gases containing sulfur trioxide, and withdrawing said gases without contacting them with alum which is at temperatures below about 600° C.

5. The process of producing alumina which comprises preparing potash alum from aluminous raw material, heating said alum at a temperature below its melting point to drive off water, further heating to a temperature of about 600° C. without decomposition or melting, and then heating at about 700° to 1000° C. to decompose the aluminum sulfate constituent of the alum, withdrawing the gases evolved during decomposition without contacting them with alum which is at temperatures below about 600° C., and separating alumina from the water-soluble constituents of the residue.

6. The process of producing alumina which comprises treating aluminous material to form aluminum sulfate in solution, adding a potassium salt to form potash alum in the solution, crystallizing the potash alum, heating said alum at a temperature below its melting point to drive off water, further heating to a temperature of about 600° C. without melting, and then heating to a temperature of about 700° to 1000° C. to decompose the alum into potassium sulfate, alumina and gases containing sulfur compounds, withdrawing said gases containing sulfur compounds without contacting them with heated alum at temperatures below about 600° C. and employing them to form more aluminum sulfate, separating the solid residue of the decomposition by dissolving the potassium sulfate in water, and adding this potassium sulfate to aluminum sulfate to form more alum.

FRANCIS C. FRARY.